United States Patent [19]

Ootsuka et al.

[11] Patent Number: 4,535,253
[45] Date of Patent: * Aug. 13, 1985

[54] MOBILE ELECTRICAL APPARATUS

[75] Inventors: Kenichi Ootsuka; Yoshikazu Miyake, both of Amagasaki, Japan

[73] Assignee: Mitsubishi Denki Kabushiki Kaisha, Tokyo, Japan

[*] Notice: The portion of the term of this patent subsequent to Jan. 24, 2001 has been disclaimed.

[21] Appl. No.: 493,239

[22] Filed: May 10, 1983

[30] Foreign Application Priority Data

May 20, 1982 [JP] Japan .............................. 57-75302[U]

[51] Int. Cl.³ ............................................. H02B 5/00
[52] U.S. Cl. ........................................ 307/9; 361/117; 361/333; 361/331; 361/132

[58] Field of Search ............... 361/331, 332, 333, 334, 361/335, 117, 39, 40, 417, 419, 420, 429, 132; 307/9, 10 R, 10 LS, 125, 126, 150; 174/161 R

[56] References Cited

U.S. PATENT DOCUMENTS 2,237,812  4/1941  De Blieux ........................... 361/333
4,367,512  1/1983  Fujita .................................. 361/334
4,427,898  1/1984  Miyake et al. ..................... 361/117

Primary Examiner—G. P. Tolin
Attorney, Agent, or Firm—Oblon, Fisher, Spivak, McClelland & Maier

[57] ABSTRACT

A mobile electrical apparatus comprises a main electrical apparatus and three lightning arresters mounted on the vehicle. The electrical devices are so arranged that they are moved to the retracted positions during transportation and are moved in the extended positions during operations.

6 Claims, 8 Drawing Figures

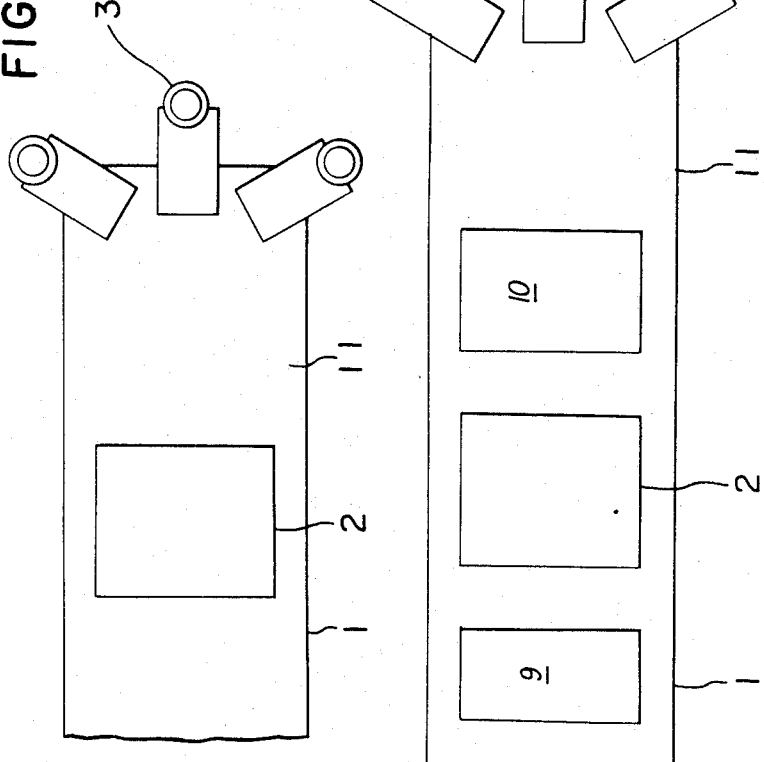

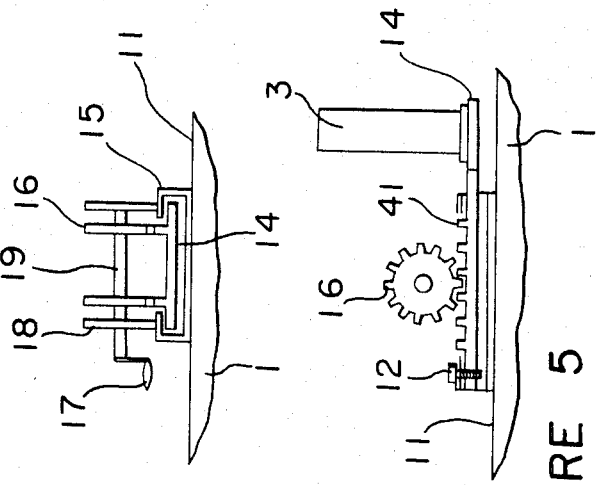
FIGURE 4
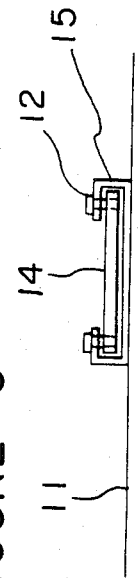
FIGURE 5
FIGURE 6
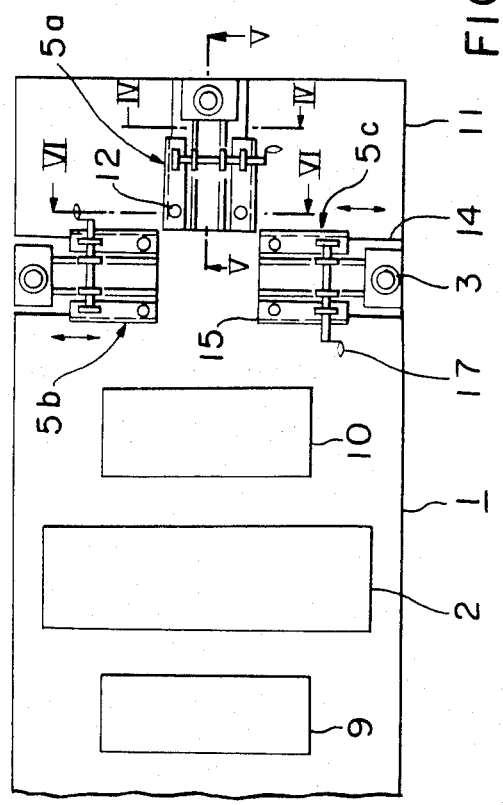
FIGURE 3

MOBILE ELECTRICAL APPARATUS

The present invention relates to a mobile electrical apparatus including a vehicle for mounting electrical apparatuses and appliances such as a transformer and so on.

Various mobile electrical apparatuses have been used. A mobile power transformation apparatus will be illustrated, as an example of the conventional mobile electrical apparatus, with reference to FIGS. 1 and 2.

In FIG. 1, a transformer 2 and a lightning arrester 3 are mounted on a vehicle 1 such as a trailer or a truck.

FIG. 2 shows another type of the mobile power transformation apparatus in which a transformer 2, a lightning arrester 3, a low voltage switch 9 and a high voltage switch 10 are mounted on a vehicle 1.

In the mobile power transformation apparatus, the interphase insulation distance between lightning arresters must be large dependent on increasing of grade of the insulating strength of the lightning arrester. The Road Traffic Control Law of some countries may prohibit the vehicle equipped with the lightning arrester having a greater interphase insulation distance from passing ways. In this case, the lightning arrester must be detached and separately packaged for transportation whereby it makes impossible to use the mobile power transformation apparatus as a fully equipped transportable mobile power transformation apparatus.

It is an object of the present invention to overcome the disadvantage of the conventional apparatus and to provide a mobile electrical apparatus which easily allows electrical apparatuses and devices mounted on a vehicle to be moved to operable positions when used and during transportation, it satisfies requirement of the regulation for transportation by moving the apparatuses at the retracting positions.

The foregoing and the other objects of the present invention have been attained by providing a mobile electrical apparatus which comprises a main electrical apparatus mounted on a vehicle and at least three electrical devices mounted on the vehicle so as to be moved in the predetermined direction respectively.

FIGS. 1 and 2 are respectively plan views of the conventional mobile power transformation apparatuses;

FIG. 3 is a schematic plan view of an embodiment of the mobile electrical apparatus of the present invention showing that three electrical devices are respectively in the retracted positions;

FIG. 4 is a cross-sectional view taken along line IV—IV of FIG. 3;

FIG. 5 is a cross-sectional view taken along line V—V of FIG. 3;

FIG. 6 is a cross-sectional view taken along VI—VI of FIG. 3;

An embodiment of the present invention will be described with reference to FIGS. 3 to 8. The same reference numerals designate the same or corresponding parts throughout figures.

Figure 7:
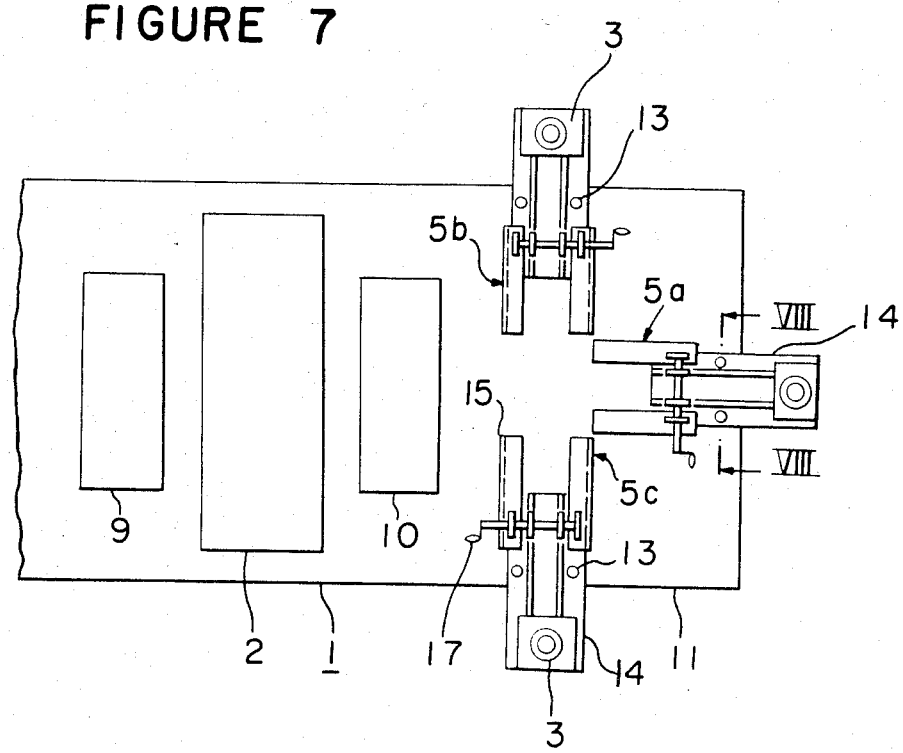
FIG. 7 is a plan view similar to FIG. 3 showing that three electrical devices are respectively in the extended positions.

The reference numeral 1 designates a vehicle. A transformer 2, a low voltage switch 9 and a high voltage switch 10 are fixedly mounted on the platform 11 of the vehicle 1. At the rear portion of the platform 11, three lightning arresters 3 are held by respective driving means 5a, 5b, 5c. Among three driving means, the first one 5a is placed at the rear end of the platform 11 so that the lightning arrester 3 held thereon is moved rearward along the longitudinal axis of the vehicle 1, to the extremely extended position as shown in FIG. 7. In the retracted position, the lightning arrester is preferably so positioned that the rear surface of the lightning arrester 3 is substantially flush with or slightly behind the rearmost end of the platform 11. The second and third driving means 5b, 5c are placed near the root of the first driving means 5a so that they are at right angle with respect to the first driving means 5a, but are opposite in moving direction each others. The driving means 5b, 5c also respectively hold the lightning arresters 3 so as to be substantially flush with or slightly behind from the side edge of the platform 11.

It is preferable to arrange the three driving means in such a manner that in fully extended positions, the lightning arresters held by the respective driving means are in right triangular positional relationship so that equidistant interphase insulation is obtainable.

The driving means 5a, 5b, 5c have the same structure and accordingly, the structure of one driving means 5a is described in detail.

A guide channel 15 is secured to the platform 11 by means of welding, screwing and so on. The guide channel 15 is prepared by bending both ends of a metallic plate as shown in FIG. 4 or can be prepared by positioning two iron channel beams side by side with their channel portions facing each others.

A slide table 14 having a width smaller than the width of the guide channel and having a length greater than the length of the guide channel 15 is inserted into the guide channel 15. The lightning arrester 3 is fixed on the outer end of the slide table 14 projecting from the guide channel 15.

There are provided a locking means for locking the slide table 14 at at least two positions on each of the driving means. The locking means at one position is formed of a pair of threaded holes or through holes formed in the upper surface of the guide channel 15, a pair of threaded holes or through holes formed in the slide table 14 at such a position that the holes of the slide table 14 are in line with the holes of the guide channel 15 when the slide table is brought to the retracted position, and locking pins or locking bolt 12 for engaging the holes.

The other one is formed of a pair of threaded holes or through holes formed in the platform 11, a pair of threaded holes or through holes formed in the slide table 14 at such a position that the holes of the slide table 14 are in line with the holes of the platform 11 when the slide table is brought to the fully extended position, and locking pins or locking bolts 13 for engaging the holes.

Supporting plates 18 are respectively secured to the guide channel 15 and a shaft 19 having one end connected with a handle 17 is horizontally and rotatably held by a bearing fitted to each of the supporting plate 18. Two pinions 16 are fitted to the shaft 19 so as to engage with racks 41 provided in parallel on the sliding table 14. A feed screw structure or a worm gear structure can be used instead of the rack-pinion structure.

In the apparatus described above, when it is to be transported, each lightning arrester is moved to the retracted position, as shown in FIG. 3, by operating the handle 17 with the aid of pinion 6.

Figure 8:
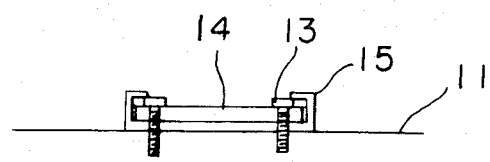
FIG. 8 is a cross-sectional view taken along line VIII—VIII of FIG. 7.

On the other hand, when the apparatus is to be operated, the lightning arresters 3 are respectively moved to the fully extended position as shown in FIG. 7 and the slide table 14 is locked at the position by means of the locking bolt as shown in FIG. 8 to assure a sufficient interphase insulation distance. Thus, a sufficient insulation distance can be obtained even though high grade of insulating strength is required for the lightning arresters.

As described above, the mobile electrical apparatus of the present invention mounts lightning arresters for protecting a main electrical apparatus in a movable manner on a vehicle on which the main electrical apparatus is mounted and accordingly, high voltage apparatus can be made into a small size.

We claim:

1. A mobile electrical apparatus comprising:
   a vehicle body having length and width dimensions;
   a main electrical apparatus mounted on said vehicle body;
   three holding means mounted on said vehicle body;
   three lightning arresters disposed adjacent to one another, each lightning arrester being mounted on one of said holding means;
   said holding means acting to move said lightning arresters in different predetermined directions by a linear sliding movement from a retracted position within said dimensions of said vehicle body for transporting to an extended position beyond said dimensions of said vehicle body for operation;
   whereby said lightning arresters are in right triangular positional relationship when in the extended position so that equidistant interphase insulation is obtained.

2. A mobile electrical apparatus accordng to claim 1 wherein said main electrical apparatus is a transformer.

3. A mobile electrical apparatus according to claim 1 wherein one of said lightning arresters is placed at the rear portion of said vehicle to be movable rearwardly along the longitudinal axis of the body of said vehicle and two other lightning arresters are movable in the traverse direction of the body of the said vehicle.

4. A mobile electrical apparatus according to claim 1 wherein said holding means comprises a guide channel secured to the floor of the body of said vehicle, a slice table inserted in said guide channel and holding said lightning arrester at one end and a driving means for moving said slide table in the extended or retracted position.

5. A mobile electrical apparatus according to claim 4 wherein said driving means comprises rack and pinion structure.

6. A mobile electrical apparatus according to claim 5 wherein said driving means is operated by a handle.

* * * * *